(12) United States Patent
    Weber

(10) Patent No.: US 10,073,261 B2
(45) Date of Patent: Sep. 11, 2018

(54) VEHICLE VISION SYSTEM CAMERA WITH ENHANCED WATER REMOVAL

(71) Applicant: MAGNA ELECTRONICS INC., Auburn Hills, MI (US)

(72) Inventor: Christian Weber, Karlsbad (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 414 days.

(21) Appl. No.: 14/876,925

(22) Filed: Oct. 7, 2015

(65) Prior Publication Data

US 2016/0103315 A1    Apr. 14, 2016

Related U.S. Application Data

(60) Provisional application No. 62/061,354, filed on Oct. 8, 2014.

(51) Int. Cl.

| | |
|---|---|
| *B60R 11/04* | (2006.01) |
| *G02B 27/00* | (2006.01) |
| *G02B 1/00* | (2006.01) |
| *H04N 5/225* | (2006.01) |
| *H04N 7/18* | (2006.01) |
| *B60R 1/00* | (2006.01) |
| *B60R 11/00* | (2006.01) |
| *B60S 1/56* | (2006.01) |

(52) U.S. Cl.
CPC ............ *G02B 27/0006* (2013.01); *B60R 1/00* (2013.01); *B60R 11/04* (2013.01); *H04N 5/2254* (2013.01); *H04N 7/183* (2013.01); *B60R 2011/004* (2013.01); *B60R 2300/408* (2013.01); *B60R 2300/8066* (2013.01); *B60S 1/56* (2013.01)

(58) Field of Classification Search
CPC ........ G02B 1/10; G02B 27/0006; G02C 7/10; B60R 1/00; H04N 5/232; H04N 13/02; H04N 7/18
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 2008/0112050 A1* | 5/2008 | Nomura ................. G02B 1/105 359/507 |

(Continued)

*Primary Examiner* — Sathyanaraya V Perungavoor
*Assistant Examiner* — Patricia I Young
(74) *Attorney, Agent, or Firm* — Honigman Miller Schwartz and Cohn, LLP

(57) ABSTRACT

A vision system of a vehicle includes a camera configured to be disposed at a vehicle so as to have a field of view exterior of the vehicle. The camera includes an imager and a lens. The imager includes a pixelated imaging array having a plurality of photosensing elements. With the camera disposed at the vehicle, the lens has an outer surface that is exposed to an environment exterior of the vehicle, and the outer surface of the lens includes a central portion and a lower portion, with the lower portion below the central portion when the camera is disposed at the vehicle. A water removal element is disposed at the lower portion of the lens. The water removal element is configured to cause a water droplet that collects at the lower portion of the outer surface of the lens to drain from the outer surface of the lens.

20 Claims, 7 Drawing Sheets

(56) References Cited

U.S. PATENT DOCUMENTS

| | | | |
|---|---|---|---|
| 2013/0141693 A1* | 6/2013 | McCabe | G02C 7/104 |
| | | | 351/159.56 |
| 2014/0104426 A1 | 4/2014 | Boegel et al. | |
| 2015/0321621 A1 | 11/2015 | Van Dan Elzen et al. | |
| 2016/0037028 A1 | 2/2016 | Biemer | |
| 2016/0044284 A1 | 2/2016 | Goseberg et al. | |
| 2016/0137126 A1* | 5/2016 | Fursich | B60R 1/00 |
| | | | 348/38 |

* cited by examiner

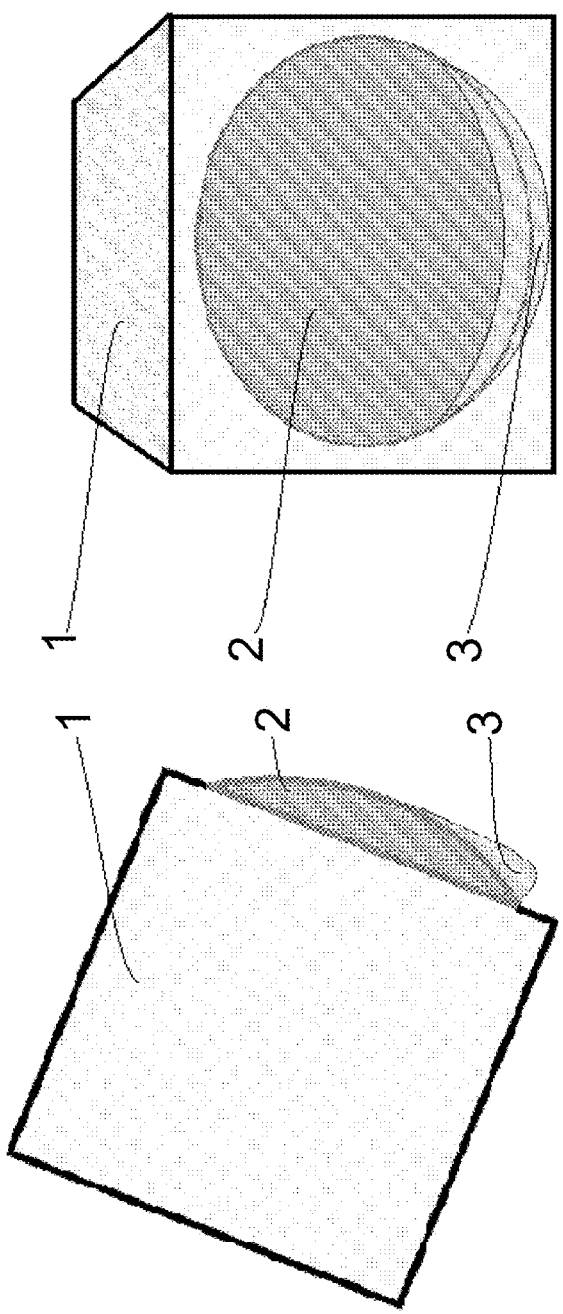

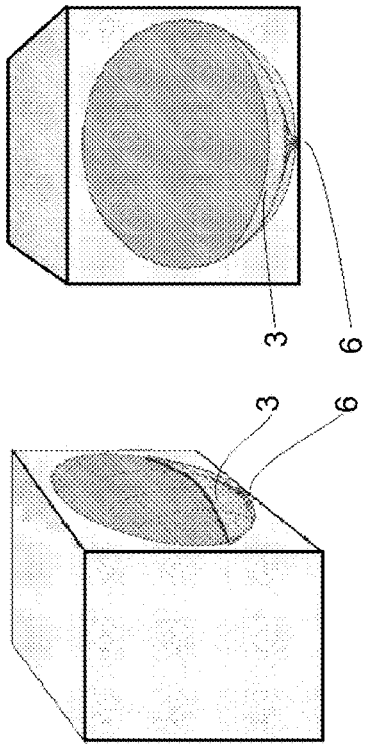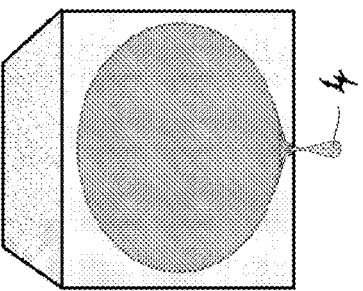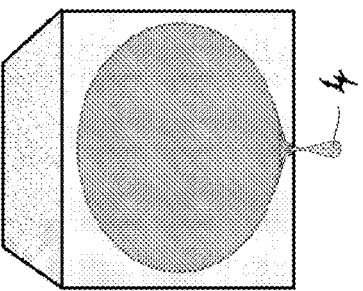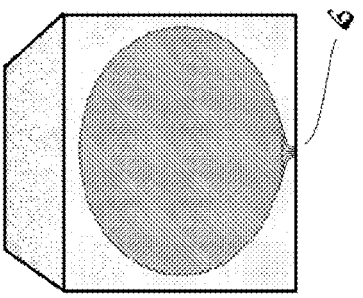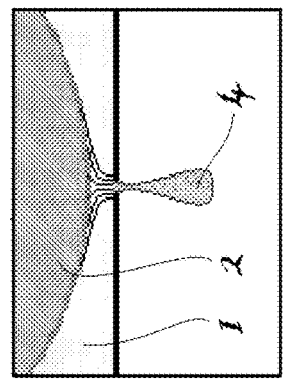

VEHICLE VISION SYSTEM CAMERA WITH ENHANCED WATER REMOVAL

CROSS REFERENCE TO RELATED APPLICATION

The present application is related to U.S. provisional application Ser. No. 62/061,354, filed Oct. 8, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a de-icing feature or water removal feature at the lens of the camera to enhance imaging during wet or humid conditions. The feature may comprise a pin or element at the lower region of the lens for piercing any water droplet that flows down to the lower region of the lens, whereby the water droplet will flow or drop or drain from the lens. Optionally, the feature may comprise a draining channel established at the lower region of the lens for causing any water droplet that flows down to the lower region of the lens to flow into the channel and flow or drop or drain from the lens. Optionally, the camera of the present invention may include a heater grid or trace established at the lens, such as at a portion of the lens that does not image onto the imaging array of sensors, whereby the heater need not be transparent, but will not interfere with the capturing of images or image data by the camera.

These and other objects, advantages, purposes and features of the present invention will become apparent upon review of the following specification in conjunction with the drawings.

BRIEF DESCRIPTION OF THE DRAWINGS

FIG. 2A is a side view of a camera and lens with a water droplet collecting at a lower region of the lens;

FIG. 2B is a front view of the camera and lens of FIG. 2A;

FIG. 4A is a side perspective view of another camera and lens of the present invention, with a draining groove established at the lower region of the lens;

FIG. 4B is a front view of the camera and lens of FIG. 4A;

FIG. 4C is another front view of the camera and lens of FIG. 3A, showing the water droplet flowing through the draining groove;

FIG. 4D is an enlarged view of the camera and lens of FIG. 4C;

FIG. 4E is another front view of the camera and lens of FIG. 4A, showing the water droplet removed from the lens;

LEGEND OF THE DRAWINGS

25 Area of an imager
26 Center of the imager
27 Center of the optical axis of a lens
28 Image area projected from lens system (image circle)
29 Heating wire
30 Contacting points of the heating wires

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
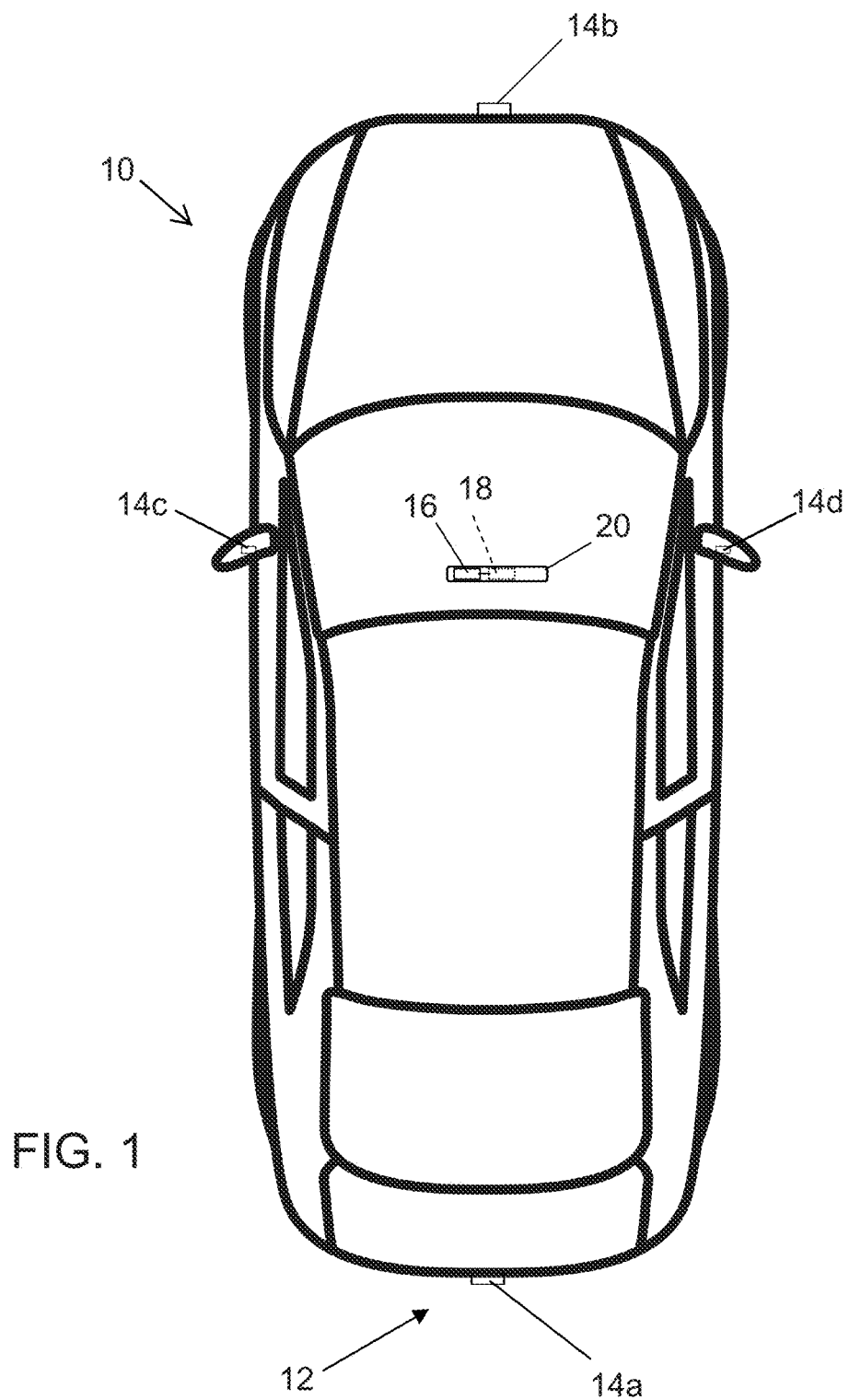
FIG. 1 is a plan view of a vehicle with a vision system that incorporates cameras in accordance with the present invention.
Figure 3A:
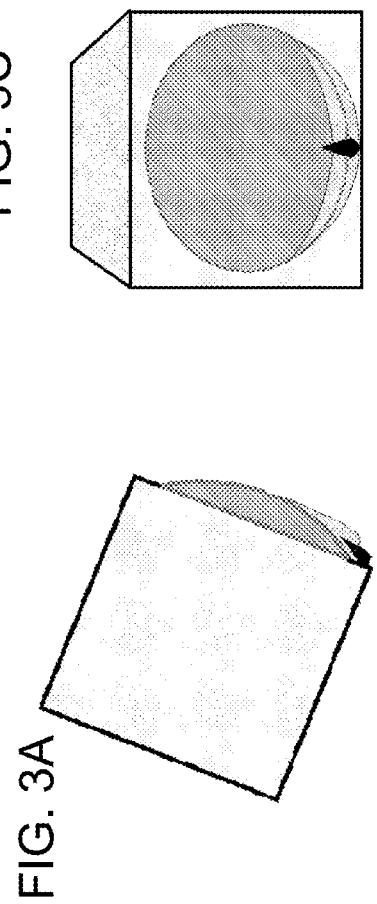
FIG. 3A is a side view of a camera and lens of the present invention, shown with a pin or element at the lower region of the lens to pierce any water droplet that may collect there in accordance with the present invention.
Figure 3B:
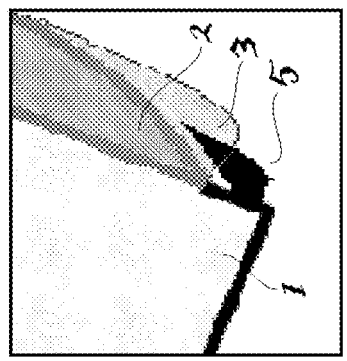
FIG. 3B is an enlarged view of the lower region of the camera and lens of FIG. 3A.
Figure 3C:
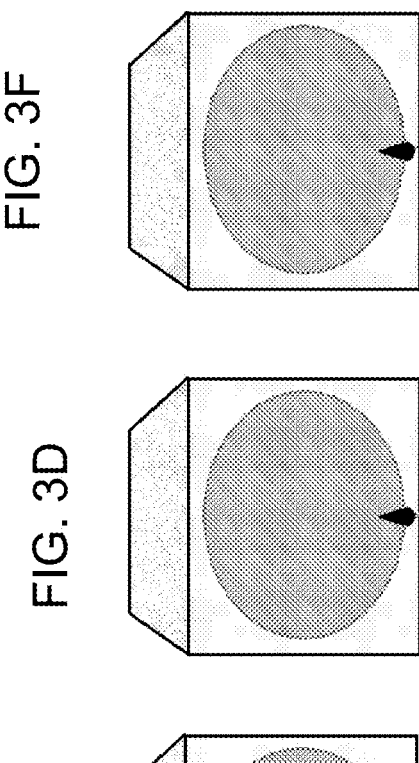
FIG. 3C is a front view of the camera and lens of FIG. 3A.
Figure 3D:
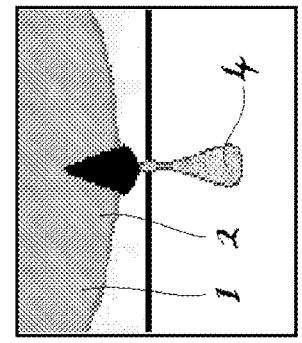
FIG. 3D is another front view of the camera and lens of FIG. 3A, showing the water droplet dripping from the pin or element.
Figure 3E:
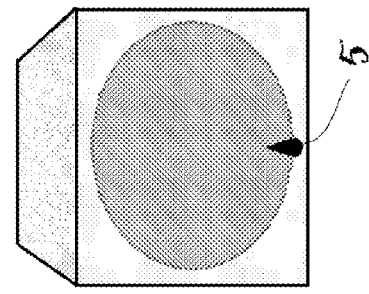
FIG. 3E is an enlarged view of the lower region of the camera and lens of FIG. 3D.
Figure 3F:
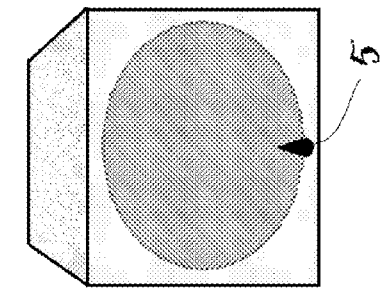
FIG. 3F is another front view of the camera and lens of FIG. 3A, showing the water droplet removed from the lens.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Vehicle cameras of surround view vision systems, side view mirror replacement systems with blind spot view and rear view system are exposed to the environment and the elements, especially water. These cameras often have curved shaped lens surfaces as the final outside lens optic. The cameras are often disposed at the vehicle and angled generally downwardly, such as at the side or rear of the vehicle.

A camera, when disposed at a vehicle so as to have an exterior field of view at or near the vehicle, may be oriented so that its outermost lens optic or element of the camera lens or lens assembly has a lowermost region or portion. For example, and such as shown in FIGS. 2A and 2B, the camera may be angled to view partially downward (below the horizon) so that the lens or outermost lens optic 2 is exposed to the environment exterior of the vehicle and has a lower portion or region below its central region or optic axis. The camera may comprise a rear camera configured to be disposed at a rear portion of the vehicle so as to have a rearward field of view rearward of the vehicle including an area immediately rearward of or near the rear of the vehicle. Optionally, the camera may comprise a side camera configured to be disposed at a side portion of the vehicle so as to have a sideward and downward field of view at the respective side of the vehicle at which the camera is mounted or disposed. Optionally, the camera may comprise a front camera configured to be disposed at a front portion of the vehicle so as to have a forward field of view forward of the vehicle. The camera or cameras may capture image data for a surround view display system or for a backup assist system or for a machine vision system and object detection system or the like.

As shown in FIGS. 2A and 2B, the camera 1 with the outer lens 2 (shown as the outermost lens element or lens optic of a lens assembly for the camera) may collect water from fog, rain, melting snow or ice or from the vehicle passing water. FIG. 2A is a side view onto an automotive vision camera, while FIG. 2B is a frontal view with the camera as partially tilted downwardly. Often a substantial water droplet 3 is remaining at the camera's outer lens 2. When the camera is directed partially downward the drop or droplet often hangs on the lens in the shape of a teardrop. The water often does not fall off or disappear when the vehicle is being driven. The water droplet at the lens is visible in the images captured by the camera and may encompass or take away a substantial area of the image, which may be disturbing to a viewer or which may negatively influence image processing or vision computation algorithms.

Because of this, there is a desire to get rid of drops on a camera, especially the visible drops which collect themselves on the downwardly directed area on the lens, such as by using low sophisticated means due to cost reasons.

As described in U.S. Publication No. US-2014-0104426, which is hereby incorporated herein by reference in its entirety, sophisticated measures may be used to prevent water, hail and snow from reaching the camera lens of a vehicle vision camera, especially aerodynamic means.

The present invention may be directly attached on the camera and thus may be mostly independent from the vehicle's design and aerodynamics.

As shown in FIGS. 3A-F, there may be a water droplet piercing or intruding element 5, such as a pin, bolt or element or the like, close to the camera's lens surface (and at the lower portion of the outermost lens surface of the lens) attached to or part of the camera housing (or other part of the camera) for intruding into a potential water drop 3 collected on the lower portion of the lens' downwardly directed end. By the intrusion of the pin or element, the surface tension of the water may be disrupted (see magnified view in FIG. 3B) before a large drop can build up and so the water droplet may drop down or flow or drain from the lens surface (see drop 4 in FIGS. 3D and 3E). The element 5 may be formed as part of the camera housing (such as via a stamping or the like for a metal camera housing or such as via an integrally molded portion of a plastic injection molded housing or the like). Optionally, the element 5 may be attached at or formed with the lens (such as via attachment at a glass lens optic or element or such as via an integrally molded portion of a polycarbonate formed lens optic or element or the like).

Optionally, in order to enhance flow or movement of water on the lens so as to accumulate as a droplet at the lower region of the lens, the lens surface (the outermost surface, which is exposed to the environment exterior of the vehicle, of the outermost lens element or lens optic of the lens or lens assembly) may be coated with a coating that enhances such water movement. For example, the lens may be coated with a hydrophobic coating that reduces its affinity for water and repels water, such that water droplets will flow over the coated lens surface. Such a hydrophobic coating increases a contact angle of water to the coated lens surface to greater than 90 degrees, causing water droplets to form that, due to gravity, may tend to move over the surface of the lens and collect at the lower surface or region of the lens, forming a large water droplet. The element 5 is disposed or established at that lower region to intrude into or pierce the formed water droplet so as to cause the water to flow from the lens.

Optionally, and as can be seen in FIGS. 4A-E, there may be a draining funnel or groove 6 at the camera's housing or at the lens edge for leading away or draining a potential water drop 3 collecting or collected on the downwardly directed end of the camera's lens (see magnified view in FIG. 4D).

Figure 5:
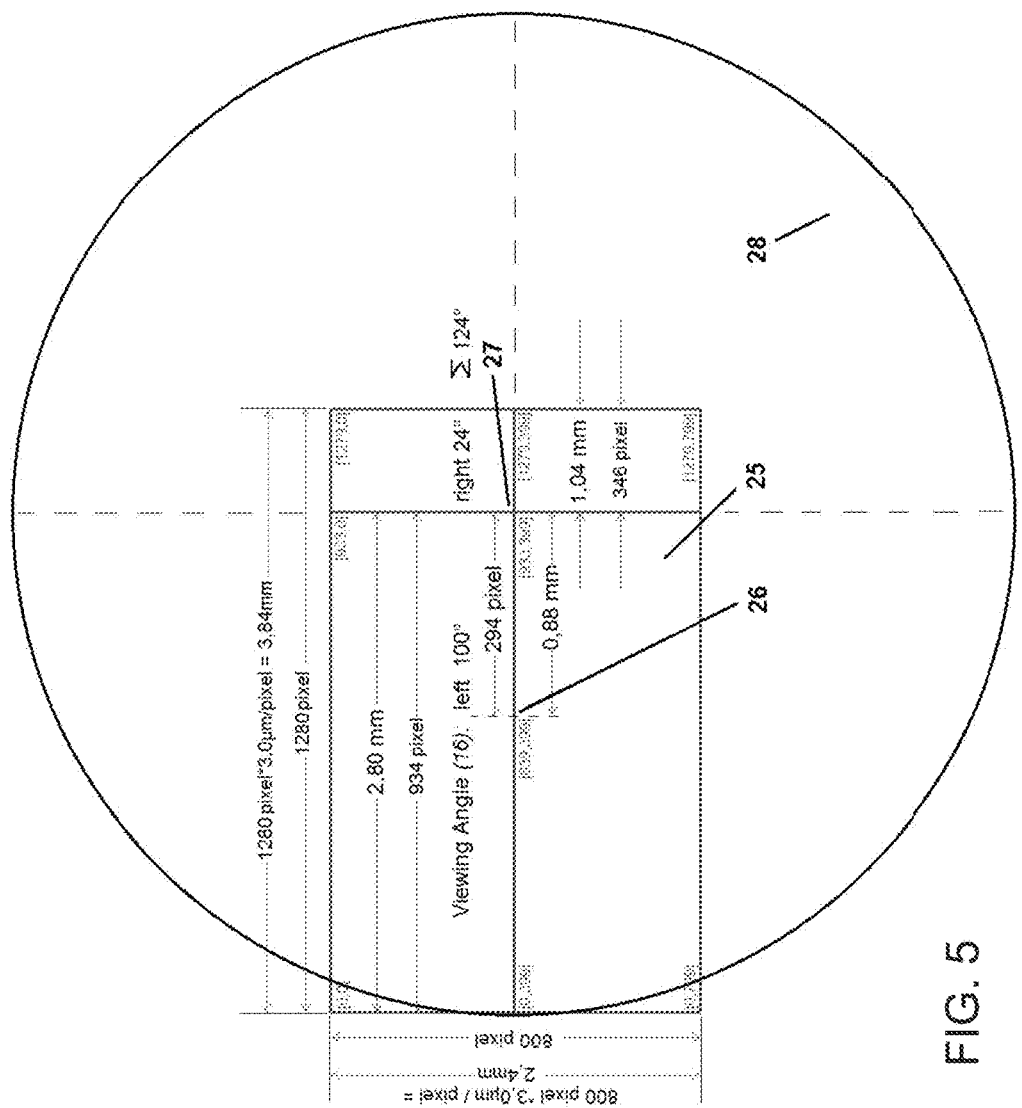
FIG. 5 is a plan view of a camera with a lens offset from the imager.

As described in U.S. patent application Ser. No. 14/705,077, filed May 6, 2015, which is hereby incorporated herein by reference in its entirety, a system may defog lenses by heating the vehicle vision system's camera lenses by a Graphene wire incorporated or applied to the outer lens. The Graphene may be invisible since it is transparent. As an alternative, the system of the present invention may defog or deice the lens system by a conventional heating wire out of a conventional heating material, such as known from defogging or deicing vehicle rear windshields. For example, the system may utilize aspects of the systems described in International Publication No. WO 2014/204794 and/or U.S. patent application Ser. No. 14/852,950, filed Sep. 14, 2015 , which are hereby incorporated herein by reference in their entireties, and which suggest having the camera imagers 25 with a center 26 assembled off center 27 of vehicle vision system's lens system, especially for fish eye and high distortion (>f theta) lenses. An example of such an assembly for vehicle side cameras is shown in FIG. 5. Such an imager—lens shifted assembly, with the lens shifted either lateral or vertically, may shift the area of the lens which is possibly covered by a hanging water drop at least partially out of the visible area of the imager (projected to the imager).

Figure 7B:
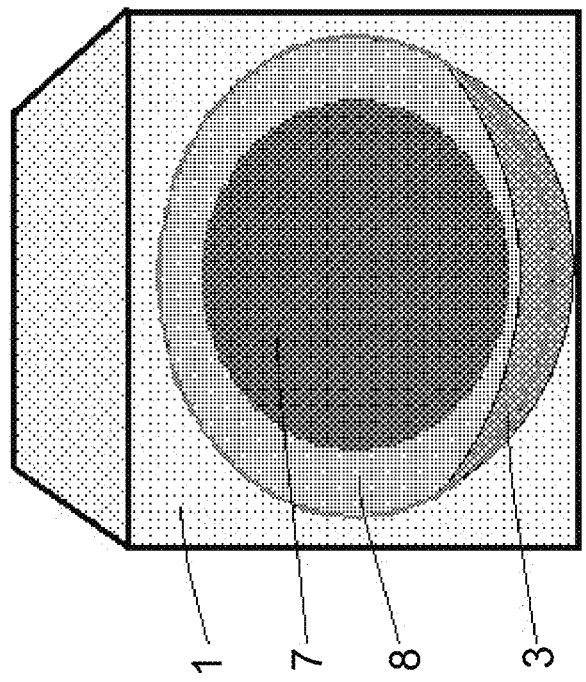
FIG. 7B is a front view of the camera and lens of FIG. 7A.
Figure 7A:
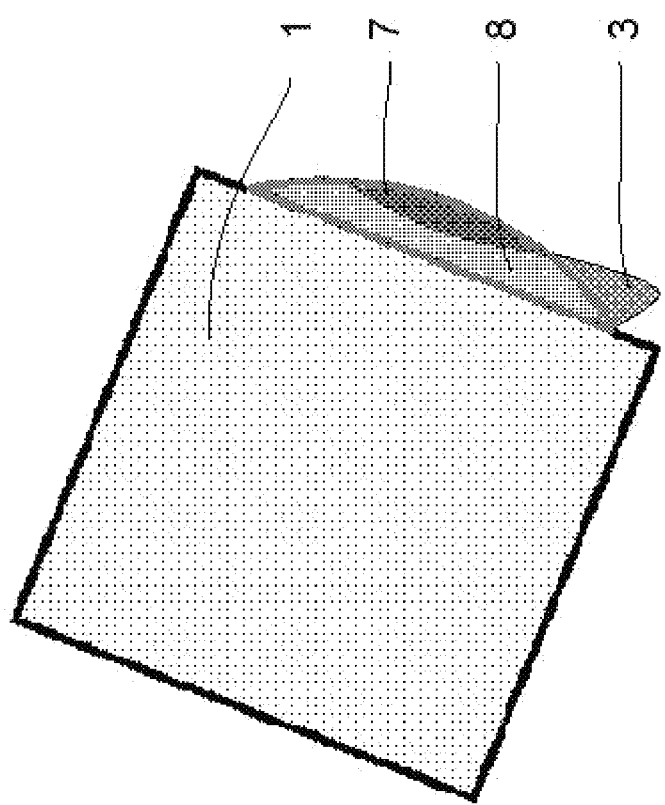
FIG. 7A is a side view of a camera and lens with a water droplet collecting at a lower region of the lens, shown with the lens having an inner region transmissive for inbound light and a border region masking light.

Optionally, an alternative solution is shown in FIGS. 7A and 7B, where the optical actively used area of the lens 2 of the camera 1 may be reduced to an inner circle or area or portion or region 7 while the peripheral or boundary areas 8 of the lens 2 are ineffective or non-light-transmissive or otherwise light attenuating. That means light incident on or at the border area of the lens does not pass through the lens (or is attenuated) and thus does not reach the imager. By that, any water drops 3 hanging on the lens, when the water stays in the border area, do not affect the captured image negatively. The masking of the border area 8 may be done by having a coating applied on the outer lens or there may be a cover glass on top that has no essential optical properties beside bearing the optionally ring form masking area, or there may be a ring-like non-light-transmissive structure applied at or on the outer lens. The masking may be provided to hide water droplets and may be provided in conjunction with the water droplet piercing or intruding elements and/or draining channel elements discussed above, such that the masking hides the presence of water droplets accumulating at the lower surface of the lens and not yet pierced or intruded or channeled so as to flow or drain from the lens surface.

Figure 6:
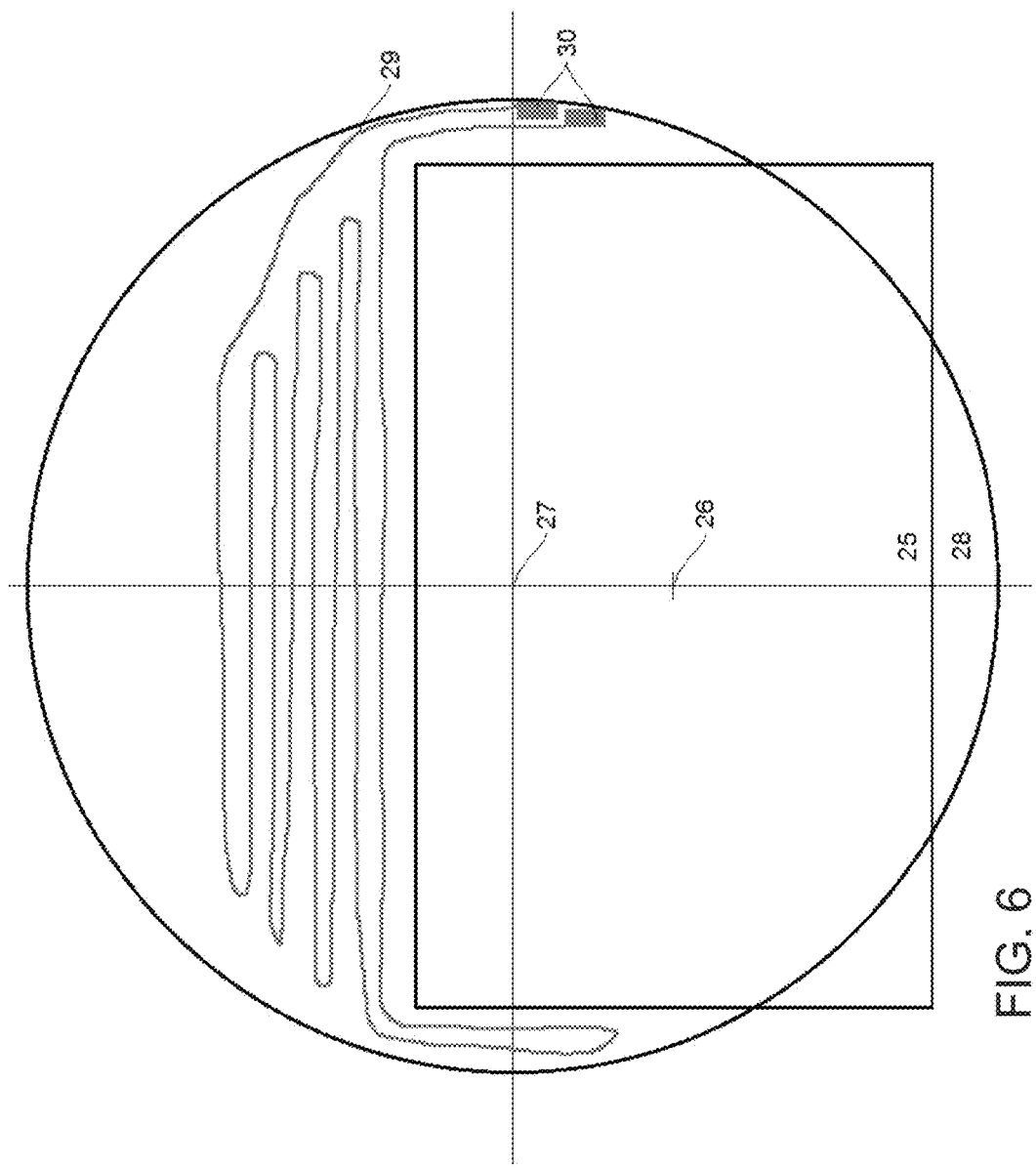
FIG. 6 is a plan view of another camera with the lens offset from the imager, and with a heater trace established at the lens where the lens is not at the imager so as to heat a portion of the lens in accordance with the present invention.

Optionally, the system of the present invention may apply heating wires 29 at the lens surface at areas which do not contribute to the image 30 projected onto the imager 25 (outside the image circle) for de-fogging and de-ice heating of the lens. An example of such an assembly is shown in FIG. 6. Thus, the lens may be heated via heater grids or the like established at the surface of the lens, with the heater grids being outside of the field of view of the camera and thus not imaged by the imager. Optionally, as an additional or alternative solution, a heating wire may be applied around the lens system, incorporated to the lens holder.

Either solution needs a power supply contact (30). That supply may be applied along the inside of the camera housing, such as at the lens holder. Optionally, the supply may be provided using "molded interconnect devices" (MID) technology. The use of MID for providing routing structures in automotive cameras is described in U.S. patent application Ser. No. 14/814,883, filed Jul. 31, 2015, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
a camera configured to be disposed at a vehicle so as to have a field of view exterior of the vehicle;
wherein said camera comprises an imager and a lens;
wherein said imager comprises a pixelated imaging array having a plurality of photosensing elements;
wherein, with said camera disposed at the vehicle, said lens has an outer surface that is exposed to an environment exterior of the vehicle;
wherein said outer surface of said lens comprises a central portion and a lower portion, and wherein said lower portion is below said central portion when said camera is disposed at the vehicle;
a water removal element disposed at said lower portion of said outer surface of said lens;
wherein said water removal element comprises structure configured to pierce a water droplet forming at said lower portion of said outer surface of said lens; and
wherein, with said camera disposed at the vehicle, said structure of said water removal element is disposed at said lower portion of said outer surface of said lens and pierces a water droplet that collects at said lower portion of said outer surface of said lens to cause the water droplet to drain from said outer surface of said lens downward around said structure.

2. The vision system of claim 1, wherein said structure configured to pierce the water droplet forming at said lower portion of said outer surface of said lens comprises a pointed element.

3. The vision system of claim 1, wherein said water removal element comprises a channel at said lower portion of said outer surface of said lens that is configured to draw water from a water droplet forming at said lower portion of said outer surface of said lens.

4. The vision system of claim 1, comprising an image processor operable to process image data captured by said camera for a driver assistance system of the vehicle.

5. The vision system of claim 1, comprising a display operable to display images derived from image data captured by said camera.

6. The vision system of claim 1, wherein said lens includes a heater element established at a surface thereof.

7. The vision system of claim 6, wherein said lens is offset relative to said imager so that a center axis of said lens is offset from a center of said imager, and wherein said heater element comprises a non-transparent heater element that is established at an offset portion of said lens that does not image onto said imager.

8. The vision system of claim 1, wherein said lower portion of said outer surface of said lens is at least partially non-light-transmissive, and wherein light incident on said at least partially non-light-transmissive lower portion of said outer surface of said lens is attenuated by said at least partially non-light-transmissive lower portion of said outer surface of said lens so as to be not imaged by said imager.

9. The vision system of claim 1, wherein said lens is offset relative to said imager so that a center axis of said lens is offset from a center of said imager, and wherein said water removal element is located at a peripheral portion of said outer surface of said lens and wherein light incident on said peripheral portion of said outer surface of said lens is not imaged by said imager.

10. The vision system of claim 1, wherein, with said camera disposed at the vehicle, said camera is angled so as to view at least partially downward.

11. The vision system of claim 1, wherein said lens comprises a plurality of lens optics and wherein said plurality of lens optics comprises an outermost lens optic, and wherein said outermost lens optic comprises said outer surface of said lens.

12. A vision system of a vehicle, said vision system comprising:
a camera configured to be disposed at a vehicle so as to have a field of view exterior of the vehicle, and wherein, with said camera disposed at the vehicle, said camera is angled so as to view at least partially downward;
wherein said camera comprises an imager and a lens;
wherein said imager comprises a pixelated imaging array having a plurality of photosensing elements;
wherein said lens comprises a plurality of lens optics and wherein said plurality of lens optics comprises an outermost lens optic, and wherein said outermost lens optic comprises an outer surface of said lens;
wherein, with said camera disposed at the vehicle, said outer surface of said lens is exposed to an environment exterior of the vehicle;
wherein said outer surface of said lens comprises a central portion and a lower portion, and wherein said lower portion is below said central portion when said camera is disposed at the vehicle;
a water removal element disposed at said lower portion of said outer surface of said lens;
wherein said water removal element comprises structure configured to pierce a water droplet forming at said lower portion of said outer surface of said lens; and
wherein, with said camera disposed at the vehicle, said structure of said water removal element is disposed at said lower portion of said outer surface of said lens and pierces a water droplet that collects at said lower portion of said outer surface of said lens to cause the water droplet to drain from said outer surface of said lens downward around said structure.

13. The vision system of claim 12, wherein said structure configured to pierce a water droplet forming at said lower portion of said outer surface of said lens comprises a pointed element.

14. The vision system of claim 12, wherein said water removal element comprises a channel at said lower portion of said outer surface of said lens that is configured to draw water from a water droplet forming at said lower portion of said outer surface of said lens.

15. The vision system of claim 12, wherein said lens is offset relative to said imager so that a center axis of said lens is offset from a center of said imager, and wherein said water removal element is located at a peripheral portion of said outer surface of said lens and wherein light incident on said peripheral portion of said outer surface of said lens is not imaged by said imager.

16. The vision system of claim 15, wherein said lens includes a heater element established at a surface thereof, and wherein said heater element comprises a non-transparent heater element that is established at an offset portion of said lens that does not image onto said imager.

17. The vision system of claim 12, wherein said lower portion of said outer surface of said lens is at least partially non-light-transmissive, and wherein light incident on said at least partially non-light-transmissive lower portion of said outer surface of said lens is attenuated by said at least partially non-light-transmissive lower portion of said outer surface of said lens so as to be not imaged by said imager.

18. A vision system of a vehicle, said vision system comprising:
a camera configured to be disposed at a vehicle so as to have a field of view exterior of the vehicle, and wherein, with said camera disposed at the vehicle, said camera is angled so as to view at least partially downward;
wherein said camera comprises a housing and a lens, and wherein an imager of said camera is disposed in said housing and wherein said lens images light at said imager;
wherein said imager comprises a pixelated imaging array having a plurality of photosensing elements;
wherein said lens comprises a plurality of lens optics and wherein said plurality of lens optics comprises an outermost lens optic, and wherein said outermost lens optic comprises an outer surface of said lens;
wherein, with said camera disposed at the vehicle, said outer surface of said lens is exposed to an environment exterior of the vehicle;
wherein said outer surface of said lens comprises a central portion and a lower portion, and wherein said lower portion is below said central portion when said camera is disposed at the vehicle;
a water removal element disposed at said lower portion of said outer surface of said lens, wherein said water removal element comprises structure configured to pierce a water droplet forming at said lower portion of said outer surface of said lens, wherein said structure of said water removal element comprises a pointed element that is formed as part of said housing of said camera; and
wherein, with said camera disposed at the vehicle, said pointed element is disposed at said lower portion of said outer surface of said lens and pierces a water droplet that collects at said lower portion of said outer surface of said lens so as to cause the pierced water droplet to drain from said outer surface of said lens downward around said pointed element.

19. The vision system of claim 18, wherein said water removal element comprises a channel at said lower portion of said outer surface of said lens that is configured to draw water from a water droplet forming at said lower portion of said outer surface of said lens.

20. The vision system of claim 18, wherein said lower portion of said outer surface of said lens is at least partially non-light-transmissive, and wherein light incident on said at least partially non-light-transmissive lower portion of said outer surface of said lens is attenuated by said at least partially non-light-transmissive lower portion of said outer surface of said lens so as to be not imaged by said imager.

* * * * *